(12) United States Patent
Ruan

(10) Patent No.: US 9,809,145 B1
(45) Date of Patent: Nov. 7, 2017

(54) AUTOMATIC STRAP RETRACTING MECHANISM FOR WHEEL RESTRAINT DEVICES

(71) Applicant: Buqin Ruan, Taizhou (CN)

(72) Inventor: Buqin Ruan, Taizhou (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 0 days.

(21) Appl. No.: 15/616,955

(22) Filed: Jun. 8, 2017

(51) Int. Cl.
  *B60P 7/08* (2006.01)
  *B60P 3/075* (2006.01)
  *B60P 3/079* (2006.01)

(52) U.S. Cl.
  CPC .............. *B60P 7/0838* (2013.01); *B60P 3/075* (2013.01); *B60P 3/079* (2013.01)

(58) Field of Classification Search
  CPC .......... B60P 7/0838; B60P 3/079; B60P 3/075
  USPC .......... 410/9–12, 19–23, 100, 103; 254/217, 254/218, 223
  See application file for complete search history.

(56) References Cited

U.S. PATENT DOCUMENTS

| 4,786,223 A * | 11/1988 | Crissy ..................... B60P 3/075 410/10 |
| 8,348,562 B2 * | 1/2013 | Bullock .................. B60P 3/075 410/10 |

FOREIGN PATENT DOCUMENTS

| CN | 2316180 Y | 4/1999 |
| CN | 2409143 Y | 12/2000 |

* cited by examiner

*Primary Examiner* — Stephen Gordon
(74) *Attorney, Agent, or Firm* — Minder Law Group; Willy H. Wong

(57) ABSTRACT

In the present automatic strap retracting mechanism for wheel restraint devices, the wheel restraint device comprises a shell, and a reel is rotatably connected inside the shell. A ratchet is fixed to the reel, and the tooth surface of the ratchet consists of a locating surface and a guiding surface. A locking piece is also hinged to the shell, and the locking piece has a pawl. The automatic strap retracting mechanism comprises a coil spring which is connected to the reel and can drive the reel to rotate in the direction of strap retracting and wind in and retract the fastening strap. The locking piece also comprises a locking rod. When the pawl detaches from the locating surface and the fastening strap is pulled out, the locking piece can swing to allow the locking rod to abut on the guiding surface.

11 Claims, 8 Drawing Sheets

AUTOMATIC STRAP RETRACTING MECHANISM FOR WHEEL RESTRAINT DEVICES

RELATED APPLICATIONS

This application claims benefit to Chinese Patent Application No. CN201710048105.8, filed Jan. 21, 2017.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention pertains to the technical field of vehicle auxiliary equipment, and more particularly to an automatic strap retracting mechanism for wheel restraint devices.

Related Art

In the process of shipping vehicles on land or by sea, vehicles need to be secured. A wheel restraint device is a device which secures the tires of a vehicle, so as to prevent the vehicle from moving freely during the transportation. In general, it comprises a shell and a fastening strap. A hook used to hook to the carrier is connected onto the shell. The fastening strap is connected to the reel of the shell and is connected with a hook. The fastening strap is pulled out, then encircles the wheel and hooks to the carrier. Hence, the wheel is held firm and secured through the fastening strap.

One prior art restraint device for transporting vehicles discloses that one end of the fastening strap has an end hook, and the end hook is arranged in the cover of a flexible wedge block. The strap coiling and securing device consists of the strap coiling shell formed by two side plates and a curved plate, a flexible pad installed on the curved plate, and the reel, pawl, strap guiding shaft as well as a underneath retractile hook installed on the two side plates. A ratchet is fixedly connected to the reel. In the retractile hook, the first link, which is hinged at the two side plates, and the second link hinged with a hook are hinge-connected through a strap passing shaft. The other end of the fastening strap, which clings to the strap guiding shaft and is arranged on the strap passing shaft, is fixed onto the reel. After use of the restraint device, it is required to retract the fastening strap which has been pulled out. Namely, it is required to wind in the reel manually to turn the reel and tighten the fastening strap. Not only is the operation complicated, but also the strap retracting speed is very slow.

SUMMARY OF THE INVENTION

One objective of one embodiment of the present invention is to avoid the issues stated above in the prior art, and to provide an automatic strap retracting mechanism for wheel restraint devices. One embodiment of the present automatic strap retracting mechanism for wheel restraint devices makes the wheel restraint device more convenient to use.

One objective of one embodiment of the present invention can be achieved by the following technical proposal:

An automatic strap retracting mechanism for wheel restraint devices comprises a shell. A reel used to wind in and retract the fastening strap is rotatably connected inside the shell, a ratchet is fixed onto the reel, and the ratchet tooth surfaces consist of locating surface used to lock the direction of strap loosening, as well as guiding surface used to lock the direction of strap tightening. A locking piece is also hinged to the shell, and the locking piece comprises a pawl which can abut and get locked on the locating surfaces. It is characterized in that:

The automatic strap retracting mechanism comprises a coil spring that is connected to the reel and can drive the reel to rotate in the direction of strap tightening to wind in and retract the fastening strap. The locking piece also comprises a locking rod fixed to the pawl, and an included angle is formed between the locking rod and the pawl. When the pawl detaches from the locating surface and the fastening strap is pulled out, the locking piece can swing to allow the locking rod to abut on the guiding surface.

The fastening strap is wound on the reel and located inside the shell. When restraining the wheel, the shell fixedly abuts on the bottom of one side of the wheel tread surface. The fastening strap encircles the wheel tread surface and gets fixed to the carrier on the other side of the wheel tread surface. By winding in the reel in the direction of strap retracting, then, the locking rod detaches from the ratchet under the act of the gravity, and the pawl abuts on the ratchet. Therefore, when the fastening strap is tightened and the ratchet rotates in the direction of strap loosening, the pawl can abut on the locating surface of the ratchet tooth immediately, so as to prevent the fastening strap from loosening and releasing. This achieves locking and securing the ratchet. After use, the fastening strap will be removed from the wheel, and under the action of the coil spring, the reel will automatically rotate in the direction of strap retracting. In addition, the pawl will not lock the ratchet, until the fastening strap is completely wound on the reel. No manual strap retracting is required, and hence the operation of retracting the strap is easy and quick. When it is required to use the wheel restraint device again, the shell is placed into the state of strap pulling. In this state, under the action of the gravity, the pawl detaches from the ratchet, and the locking rod abuts on the ratchet. In addition, when the reel rotates in the direction of strap loosening, the fastening strap is pulled out, and at this point, the locking rod will not lock the ratchet. When the fastening strap is pulled out the appropriate length and pulling stops, the coil spring applies forces to the reel, making the reel tend to rotate in the direction of strap retracting. At this point, the locking rod can abut on the guiding surface of the ratchet tooth immediately, so as to lock the ratchet and prevent the reel from retracting the fastening strap again under the action of the coil spring. Therefore, the operation of pulling out the fastening strap is also easy and quick.

In one embodiment of the automatic strap retracting mechanism for wheel restraint devices, a curved wedge plate used to abut on the vehicle wheel tread surface is fixed to the shell. When the curved wedge plate is placed facing downward, the locking rod is below the pawl. The locking piece also comprises a counterweight block which can make the locking rod abut on the guiding surface of the ratchet, when the ratchet rotates in the direction of strap retracting. When the fastening strap tightly holds the wheel, the concave surface of the curved wedge plate can fit the wheel tread surface. When the curved wedge plate is placed facing downward, it is in the state of the operation for pulling out the strap. The counterweight block is the impetus for the locking piece to swing. Under the action of the counterweight block, the locking rod swings so that the pawl detaches from the ratchet. In addition, the locking rod abuts on the ratchet, so that once the reel tends to rotate in the direction of strap retracting; it abuts on the guiding surface in time to lock the ratchet.

In one embodiment of the automatic strap retracting mechanism for wheel restraint devices, the locking piece comprises an axial part. Both ends of the axial part are rotatably connected to the inner wall of the shell, and the axial part is parallel to the reel. The locking rod and the pawl are located on the end of the axial part. The counterweight block is fixed to the axial part, and when the curved wedge plate is placed facing downward, the locking rod and the counterweight block are located respectively on the two sides of the vertical plane containing the axial part. Under the action of the counterweight block, the locking rod tends to swing upward and abuts on the ratchet. The axial part is the place containing the axis line around which the locking piece swings. When the curved wedge plate is placed facing downward, the locking rod and the counterweight block are located respectively on the two sides of the vertical plane containing the axial part. Under the action of the gravity of the counterweight block, the locking rod tends to swing upward and abuts on the ratchet.

In one embodiment of the automatic strap retracting mechanism for wheel restraint devices, a curved wedge plate used to abut on the vehicle wheel tread surface is fixed to the shell. When the curved wedge plate is placed facing downward, the locking rod is below the pawl. The locking piece also comprises a counterweight rod, and both ends of the counterweight rod are rotatably connected to the inner wall of the shell. The locking rod and the pawl are both fixed to the end of the counterweight rod, and the central part of the counterweight rod bends to form a protruding counterweight part. When the curved wedge plate is placed facing downward, the locking rod and the counterweight part are respectively located on the two sides of the vertical plane containing the axis line linking the ends of the counterweight rod. This is an alternative structure of the locking piece. It is directly and rotatably connected to the shell through the counterweight rod, and the counterweight rod bends to form the counterweight part. It also has the effect of driving the locking rod to abut on the ratchet.

In one embodiment of the automatic strap retracting mechanism for wheel restraint devices, on the locking rod, there is a curved pushing surface located on the side of the locking rod, and an abutting surface located on the end of the locking rod. When the curved wedge plate is placed facing downward and the ratchet rotates in the direction of strap loosening, the locating surface of the ratchet tooth can push the curved pushing surface downward. When the ratchet rotates in the direction of strap retracting, the guiding surface of the ratchet tooth can abut on the abutting surface of the locking rod. When the curved wedge plate is placed facing downward, the end of the locking rod is located on the lower side of the ratchet. At this point, the curved pushing surface faces upward, so when the ratchet rotates in the direction of strap loosening, the locating surface of the ratchet tooth can push the curved pushing surface downward, making the ratchet tooth passes the end of the locking rod, and the fastening strap is continuously pulled out. However, after the fastening strap is pulled out in place, and when the ratchet rotates in the direction of strap retracting under the action of the coil spring, the locking rod can abut on the guiding surface of the ratchet tooth in time, so as to lock the ratchet and prevent the fastening strap from being retracted again. This makes the operation of pulling out the fastening strap more convenient.

In one embodiment of the automatic strap retracting mechanism for wheel restraint devices, the locking rod is made of plastic or rubber, and the locking rod is sleeved over and fixed to the end of the axial part. The pawl and the axial part are of an integral structure. Since the locating surface of the ratchet tooth repeatedly pushes the locking rod downward during the process of pulling out the fastening strap, under the action of the counterweight block, the curved pushing surface of the locking rod repeatedly collides with the locating surface of the ratchet tooth. A locking rod made of plastic or rubber can reduce the noise. Of course, because, when the locking rod abuts on the guiding surface to lock the ratchet, the force to rotate the ratchet is only provided by the coil spring. Therefore, the force that the ratchet applies to the locking rod is small, and materials such as plastic or rubber can meet the strength requirement of the locking rod. However, when the fastening strap is tightly holding the wheel, it is required to position the whole vehicle, and at this point, the ratchet is positioned by the pawl, so the pawl needs to be integrated with the axial part and made of metal, having a relatively high strength.

In one embodiment of the automatic strap retracting mechanism for wheel restraint devices, both ends of the axial part are inserted in rotating sleeves. Mounting holes are arranged on the side walls of the shell, and the rotating sleeves are rotatably connected inside the mounting holes. This reduces the resistive force when the locking piece swings, so as to allow the locking piece to swing freely under the action of the gravity of the counterweight block.

In one embodiment of the automatic strap retracting mechanism for wheel restraint devices, the shell comprises two half shells, and both half shells comprise curved base plates and side plates, which are fixed to the base plates. The two half shells are fixed and connected to each other by bolts, and the two base plates abut on each other to form a tire blocking plate. The curved wedge plate is fixed onto the tire blocking plate, and the reel is rotatably connected to the two side plates. The shell is used to install the parts such as the reel, the fastening strap, the curved wedge plate and etc., so the structure of two half shells fixed connected to each other is adopted. It is easy for the assembly.

In one embodiment of the automatic strap retracting mechanism for wheel restraint devices, both ends of the reel stretches out of the side plates, and a connecting sleeve is sleeved over and fixed to one of the stretched ends. A cover is also fixed to one side plate, and the coil spring is arranged inside the cover. One end of the coil spring is fixed to the connecting sleeve, and the other end is fixed to the inner circumferential wall of the cover. The coil spring is wound inside the cover, making the structure compact. When the fastening strap is pulled out, the coil spring is wound and taken up and produces elastic force. Therefore, when it is required to retract the strap, the coil spring can achieve an automatic rotation of the reel by the elastic force.

In one embodiment of the automatic strap retracting mechanism for wheel restraint devices, a connecting opening is arranged on the connecting sleeve. There is a connecting bulge on the inner wall of the cover, and an L-shaped slot is arranged on the connecting bulge. Both ends of the coil spring are bended into hook shapes, one end of the coil spring hooks in the connecting opening of the connecting sleeve, and the other end hooks in the L-shaped slot of the connecting bulge. This makes the installation of the coil spring more convenient, and the reliability of the connection is higher.

Compared to the prior art, one embodiment of the present automatic strap retracting mechanism for wheel restraint devices has the following advantages:

1. After use, the fastening strap will be removed from the wheel, and under the action of the coil spring, the reel will automatically rotate in the direction of strap retracting. In addition, the pawl will not lock the ratchet, until the fastening strap is completely wound on the reel. No manual strap retracting is required, and hence the operation of retracting the strap is easy and quick.

2. When the fastening strap is pulled out the appropriate length and pulling stops, the locking rod can abut on the guiding surface of the ratchet tooth immediately, so as to lock the ratchet and prevent the reel from retracting the fastening strap again under the action of the coil spring. Therefore, the operation of pulling out the fastening strap is also easy and quick.

3. Since the locking rod is made of plastic or rubber, not only is the strength requirement met, but also the noise is reduced when it collides with the locating surface of the ratchet tooth.

DETAILED DESCRIPTION OF THE INVENTION

The embodiments of this invention will be described below and the technical solutions of the invention will be further illustrated in connection with the accompanying figures. However, the present invention shall not be limited to these embodiments.

First Embodiment

Figure 1:
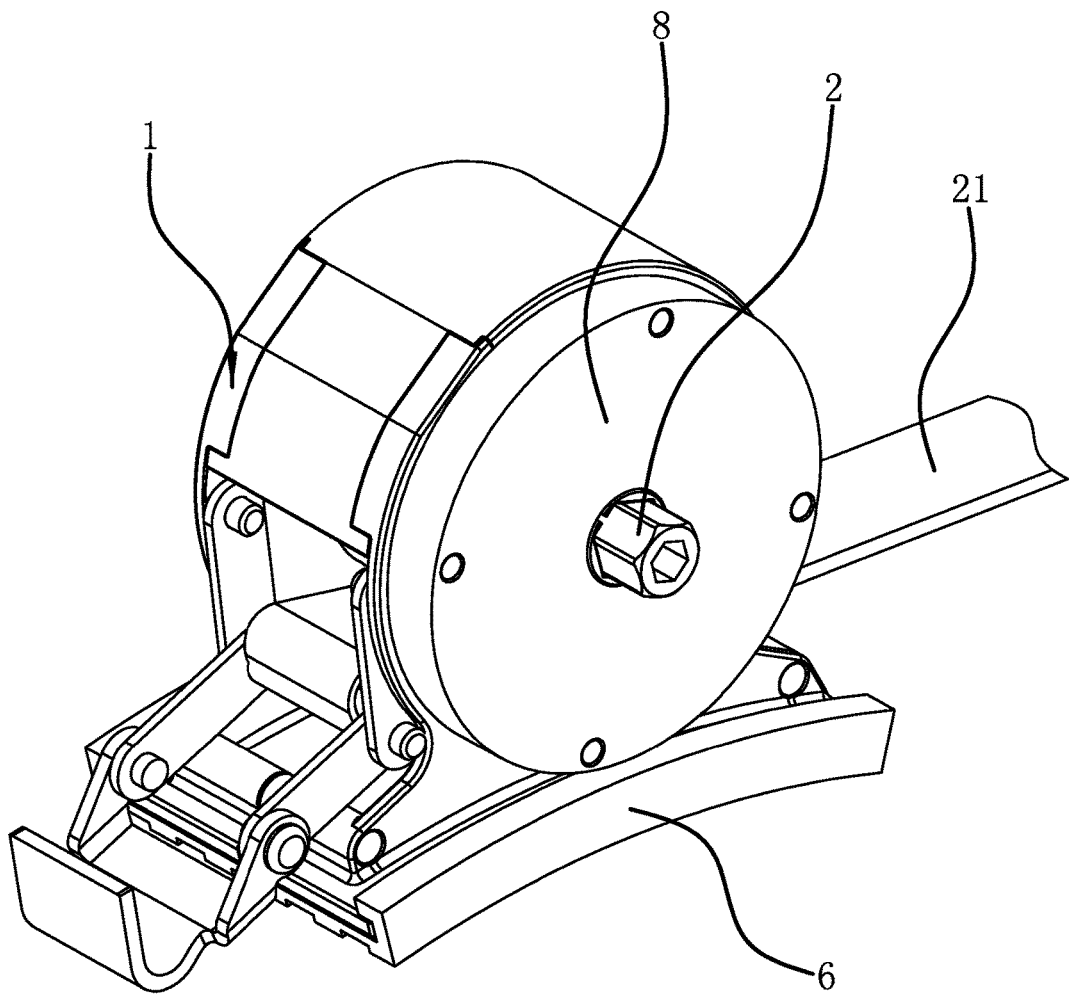
FIG. 1 is a partial perspective view of one embodiment of the wheel restraint device.
Figure 2:
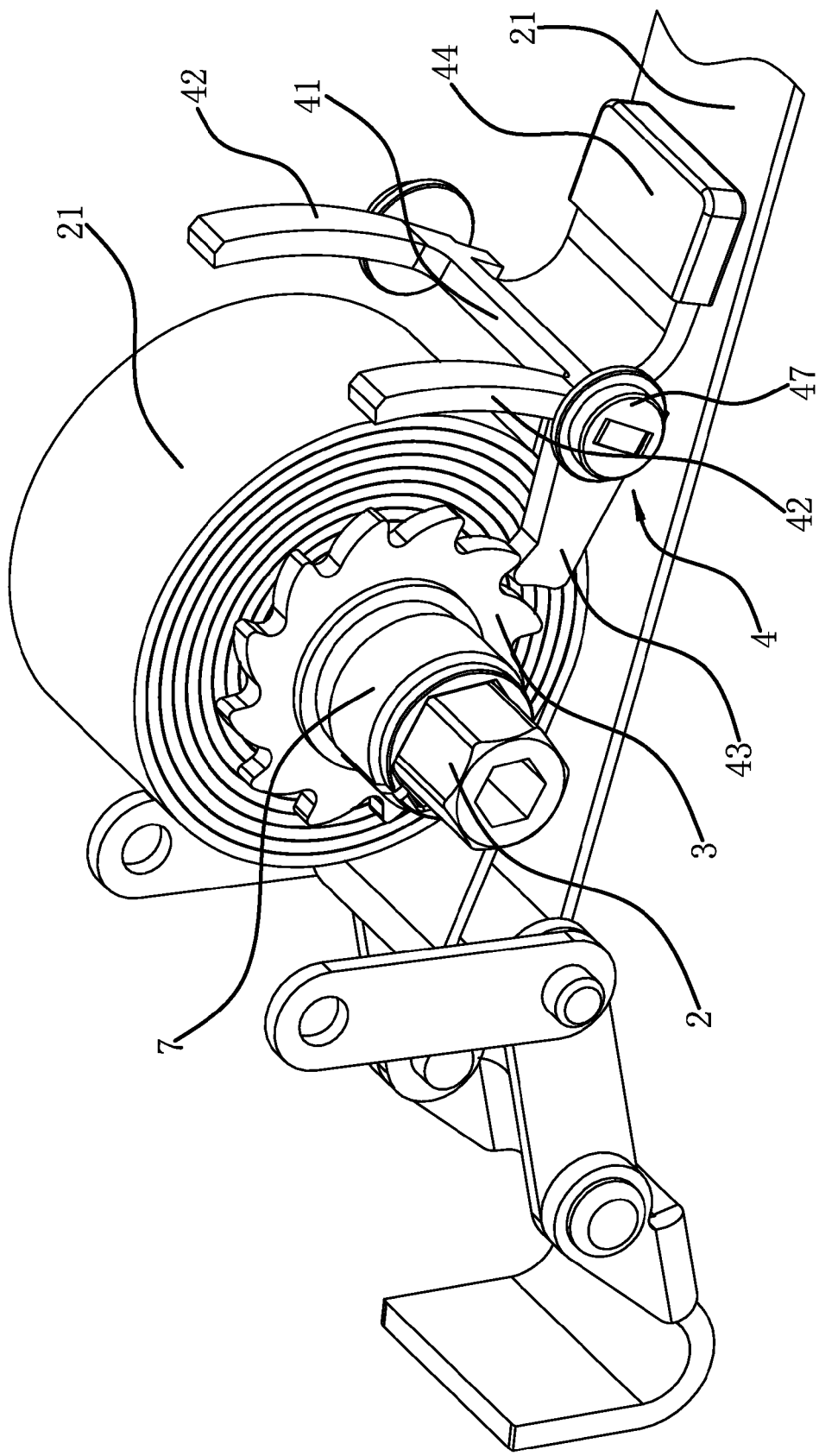
FIG. 2 is a partial perspective view of one embodiment of the wheel restraint device with the shell not installed yet.
Figure 3:
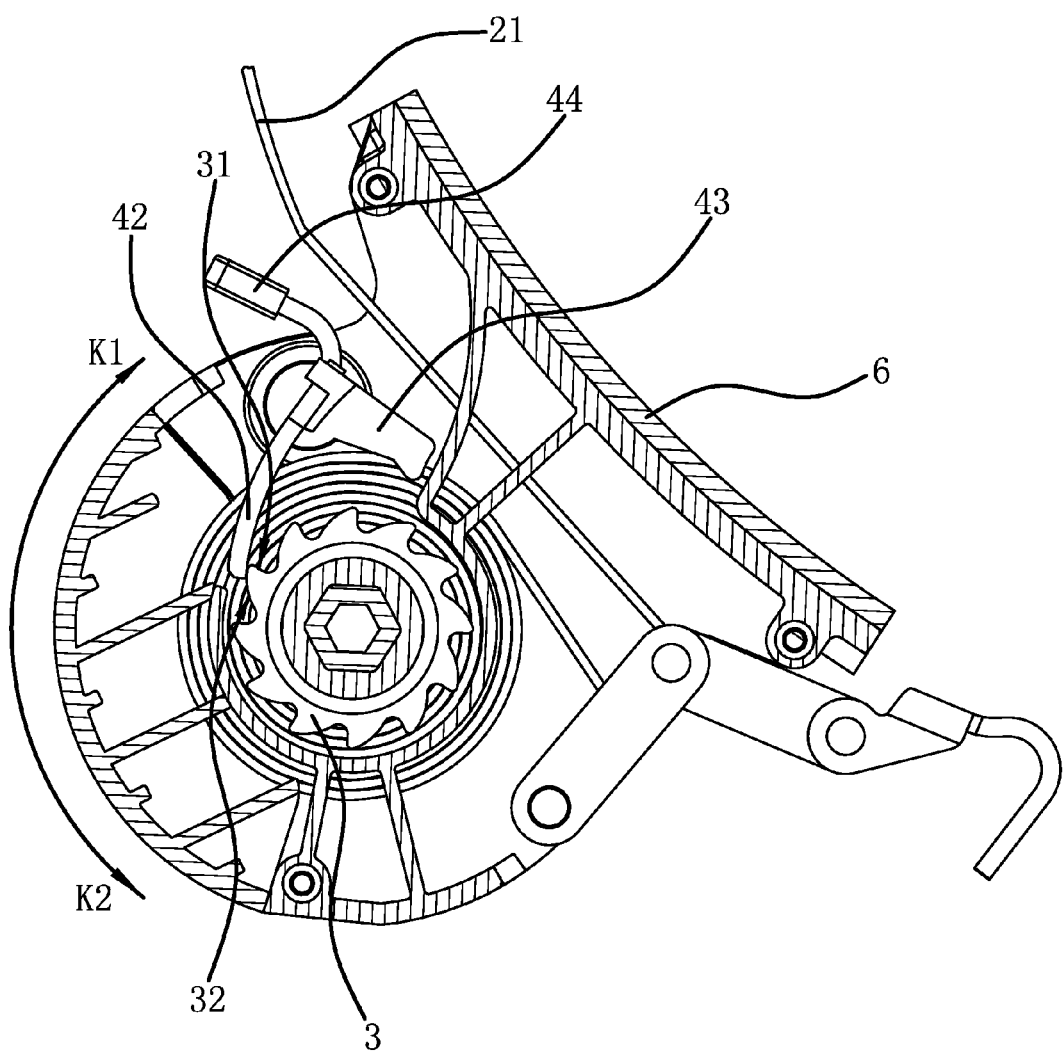
FIG. 3 is a sectional view of one embodiment of the wheel restraint device while restraining the wheel or retracting the strap.
Figure 4:
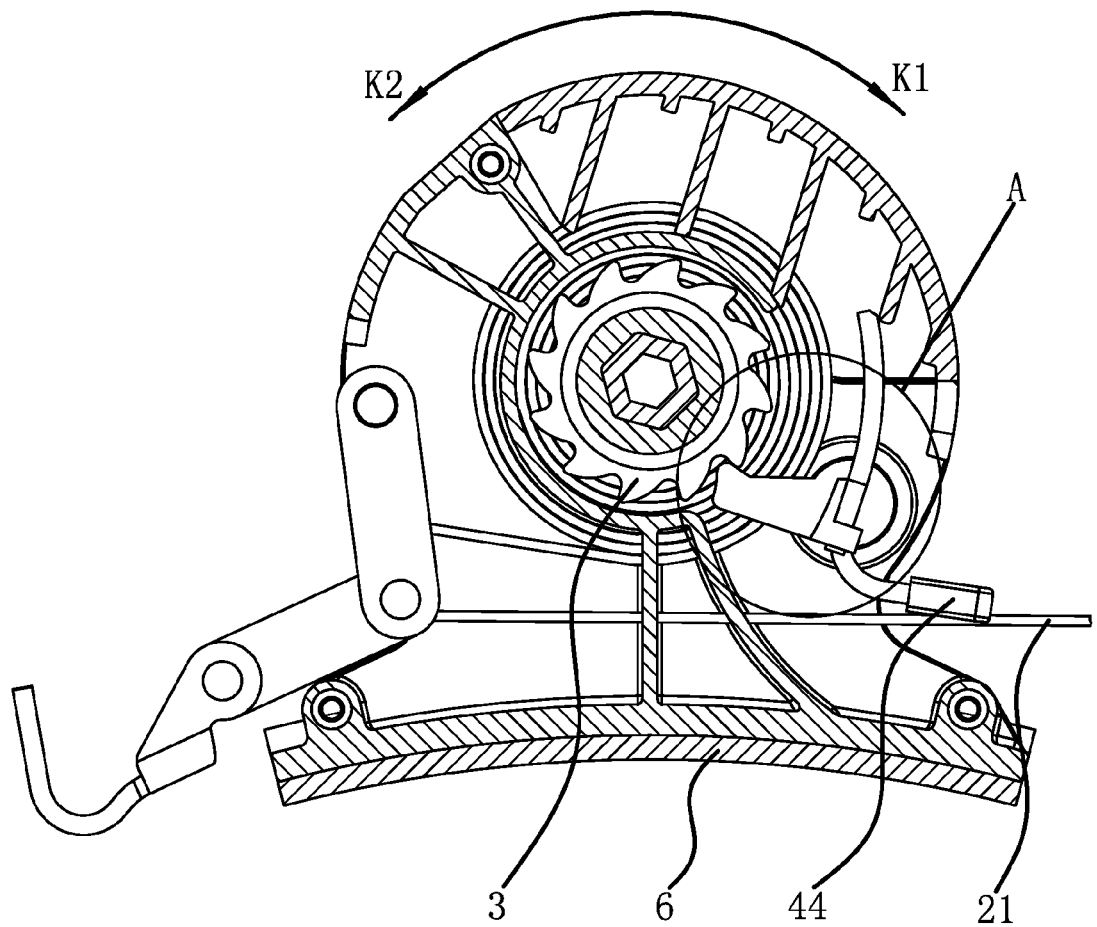
FIG. 4 is a sectional view of one embodiment of the wheel restraint device while the fastening strap is pulled out.
Figure 5:
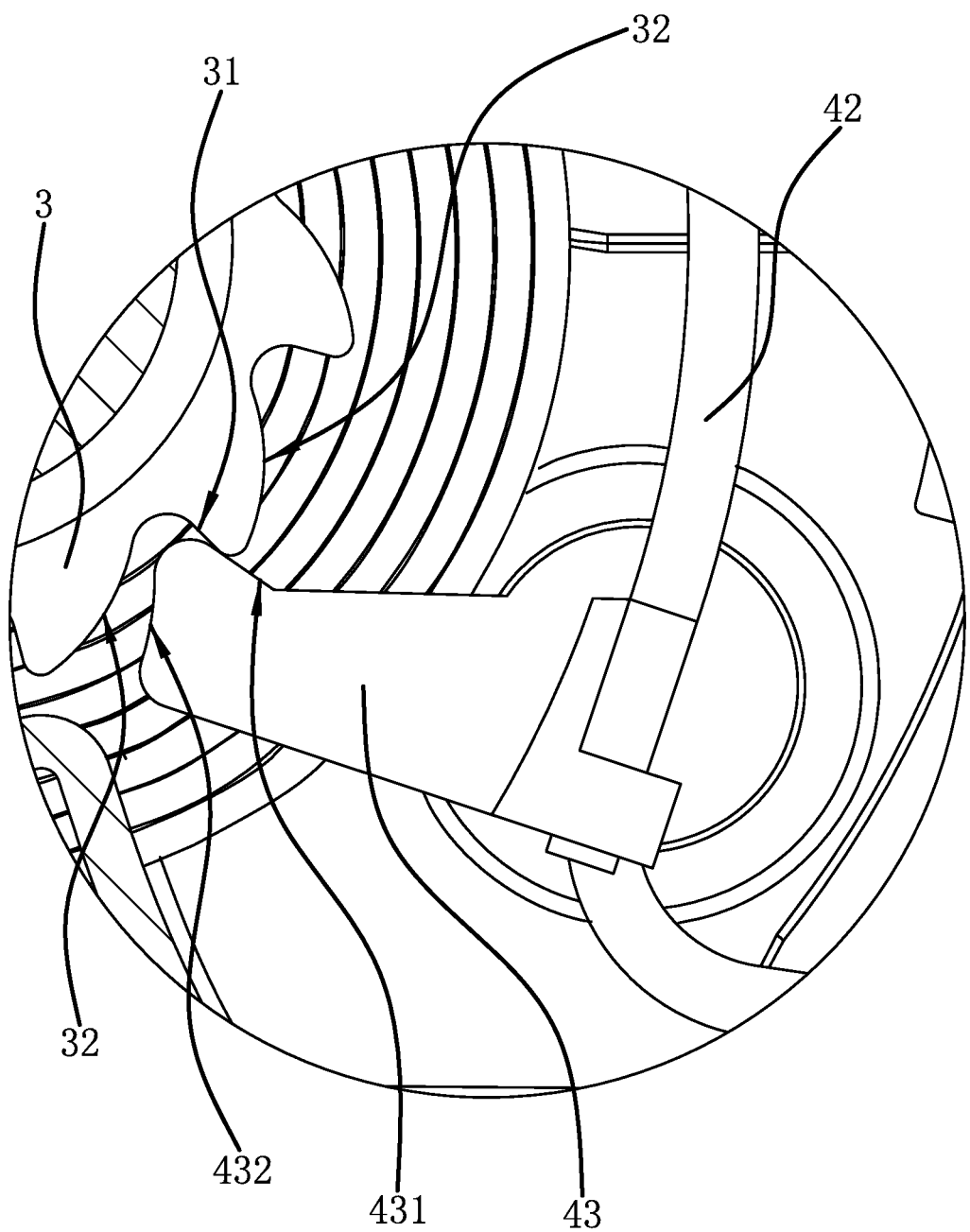
FIG. 5 is a detailed view of Section A in FIG. 4.

As shown in FIG. 1 and FIG. 2, in an automatic strap retracting mechanism for wheel restraint device, the wheel restraint device comprises a shell (1). A reel (2) is rotatably connected to the shell (1), and a fastening strap (21) is wound on the reel (2). The fastening strap (21) is located inside the shell (1). A ratchet (3) is fixed to the reel (2), and the ratchet tooth of the ratchet (3) has a locating surface (31) and a guiding surface (32). A locking piece (4) is hinged to the shell (1). The locking piece (4) comprises a pawl (42), a locking rod (43) and a counterweight block (44), and the three parts are fixed to each other. An inclusion angle forms between the locking rod (43) and the pawl (42), and the counterweight block (44) and the locking rod (43) are located on the two sides of the pawl (42). On the locking rod (43), there is a curved pushing surface (431) and an abutting surface (432) respectively. The curved pushing surface (431) is located in the side edge of the locking rod (43), and the abutting surface (432) is located on the end of the locking rod (43). As shown in FIG. 3, which shows the state of the shell (1) when the fastening strap (21) tightly holds the wheel, in this state, under the action of the gravity of the counterweight block (44), the locking rod (43) detaches from the ratchet (3), and the pawl (42) abuts on the ratchet (3). Here direction "K1" is the direction that the locating surface (31) faces, namely, the direction in which the ratchet (3) rotates when loosening the strap. Direction "K2" is the direction that the guiding surface (32) faces, namely, the direction in which the ratchet (3) rotates when retracting the strap. When the reel (2) rotates in direction "K2" the pawl (42) abuts on the guiding surface (32) and slides along the guiding surface (32). Namely, the pawl (42) is unable to lock the ratchet (3). After the fastening strap (21) tightly holds the wheel, the wheel produces a reaction force against the fastening strap (21), making the reel (2) tend to rotate in direction "K1" At this point, the pawl (42) can abut on the locating surface (31) of the ratchet tooth, so as to lock the ratchet (3). Namely, locking the wheel by the fastening strap (21) is achieved. A coil spring (5) is also connected to the reel (2) of the present wheel restraint device. When the fastening strap (21) is pulled out, the coil spring (5) produces a force against the reel (2). Namely, FIG. 3 also shows the state of the shell (1) when the strap is retracted. When the strap is retracted, the fastening strap (21) detaches from the wheel from its side. Since the force from the wheel is lost, the force produced by the coil spring (5) against the reel (2) makes the reel (2) able to rotate in direction "K2" allowing the reel (2) to automatically wind and take up the fastening strap (21). As shown in FIG. 4 and FIG. 5, which shows the state of the shell (1) when the fastening strap (21) is pulled out, in this state, under the action of the gravity of the counterweight block (44), the pawl (42) detaches from the ratchet (3), and the curved pushing surface (431) of the locking rod (43) tends to abut on the locating surface (31) of the ratchet tooth. At this point, the reel (2) rotates in direction "K1" and fastening strap (21) is pulled out. The ratchet tooth of the ratchet (3) pushes the curved pushing surface (431) of the locking rod (43) through the locating surface (31). Namely, the locking rod (43) is unable to lock the ratchet (3). When the fastening strap (21) is pulled out the appropriate length and pulling stops, the coil spring (5) applies forces to the reel (2), making the reel (2) tend to rotate in direction "K2" At this point, the abutting surface (432) of the locking rod (43) can abut on the guiding surface (32) of the ratchet tooth, so as to lock the ratchet (3) and prevent the reel (2) from retracting the fastening strap (21) again under the action of the coil spring (5).

Figure 6:
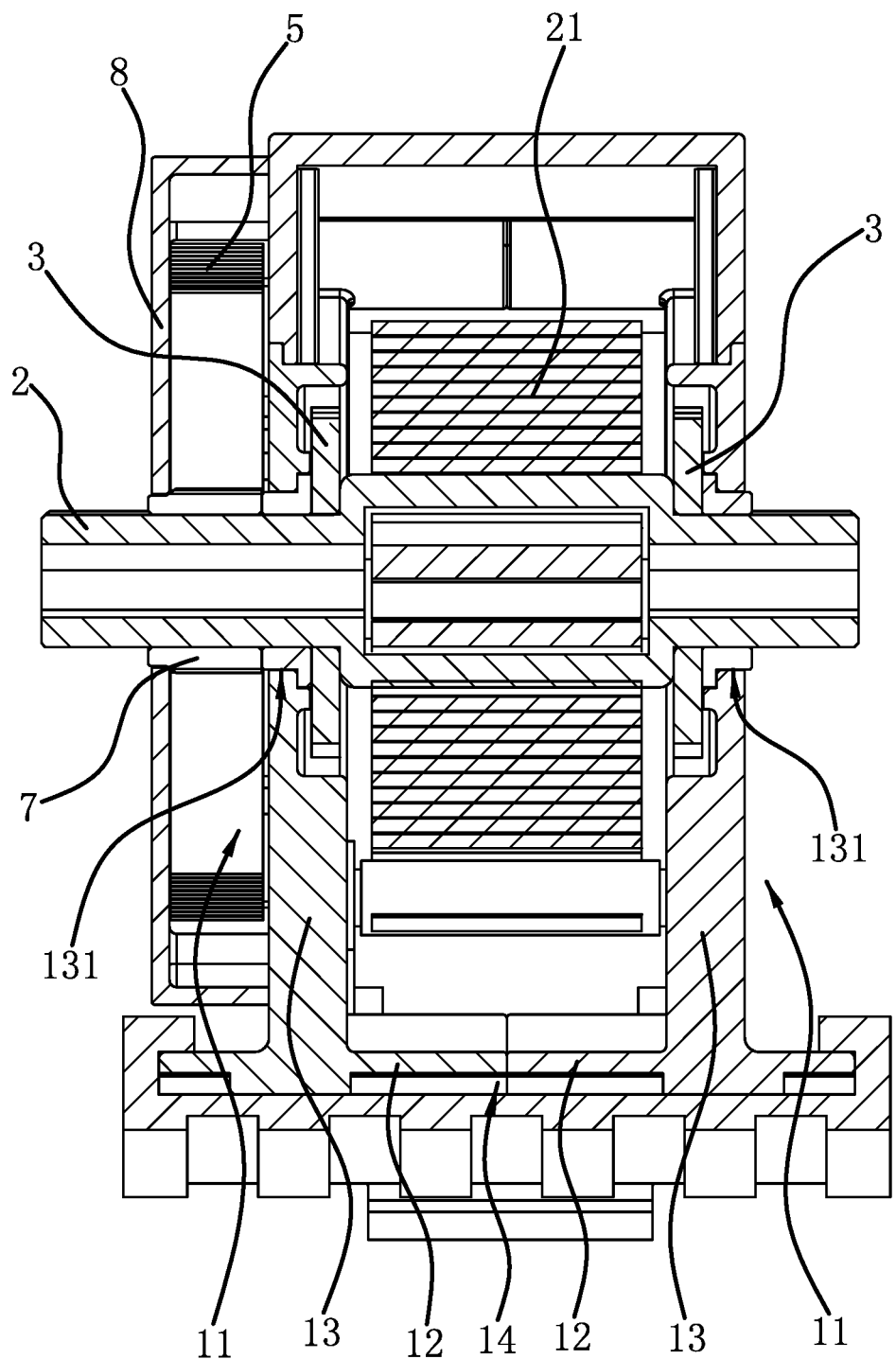
FIG. 6 is a sectional view of one embodiment of the wheel restraint device from another perspective.
Figure 7:
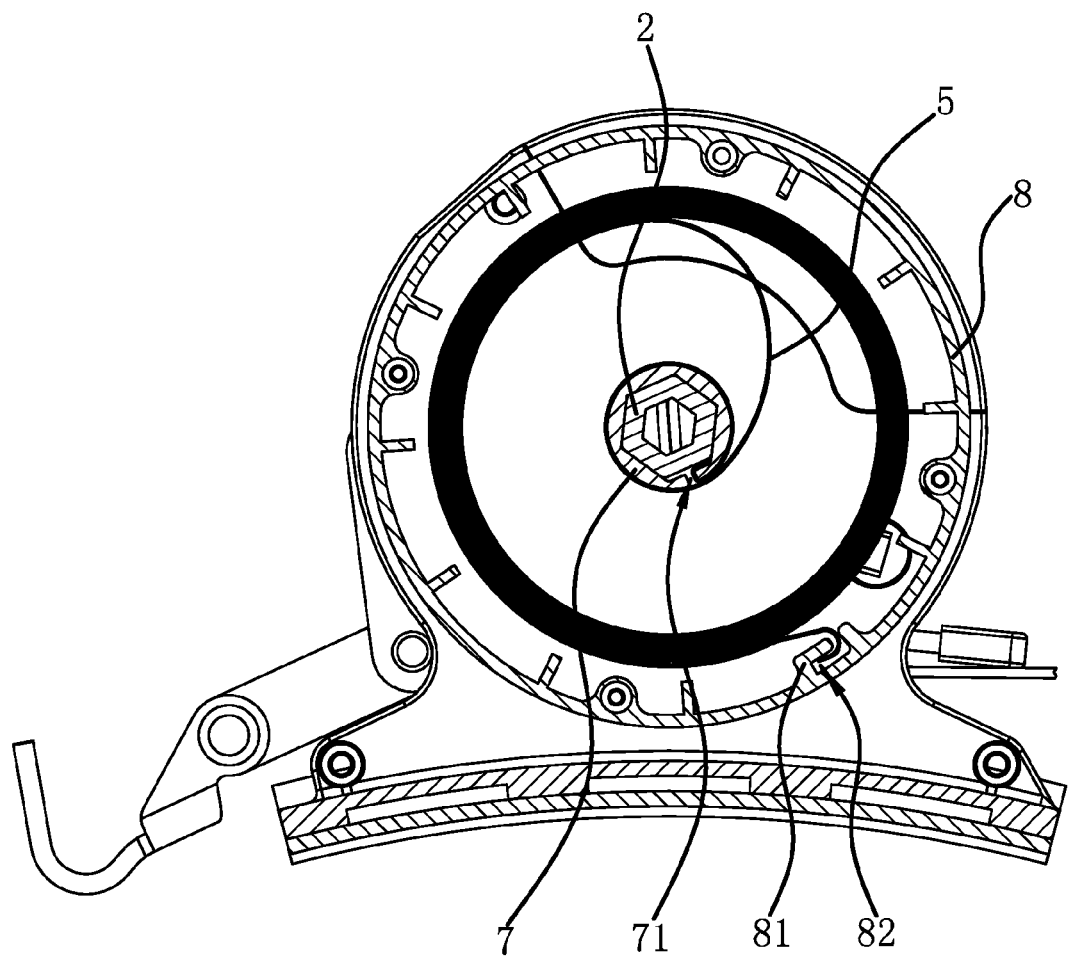
FIG. 7 is a sectional view of the cover of one embodiment of the wheel restraint device.
Figure 8:
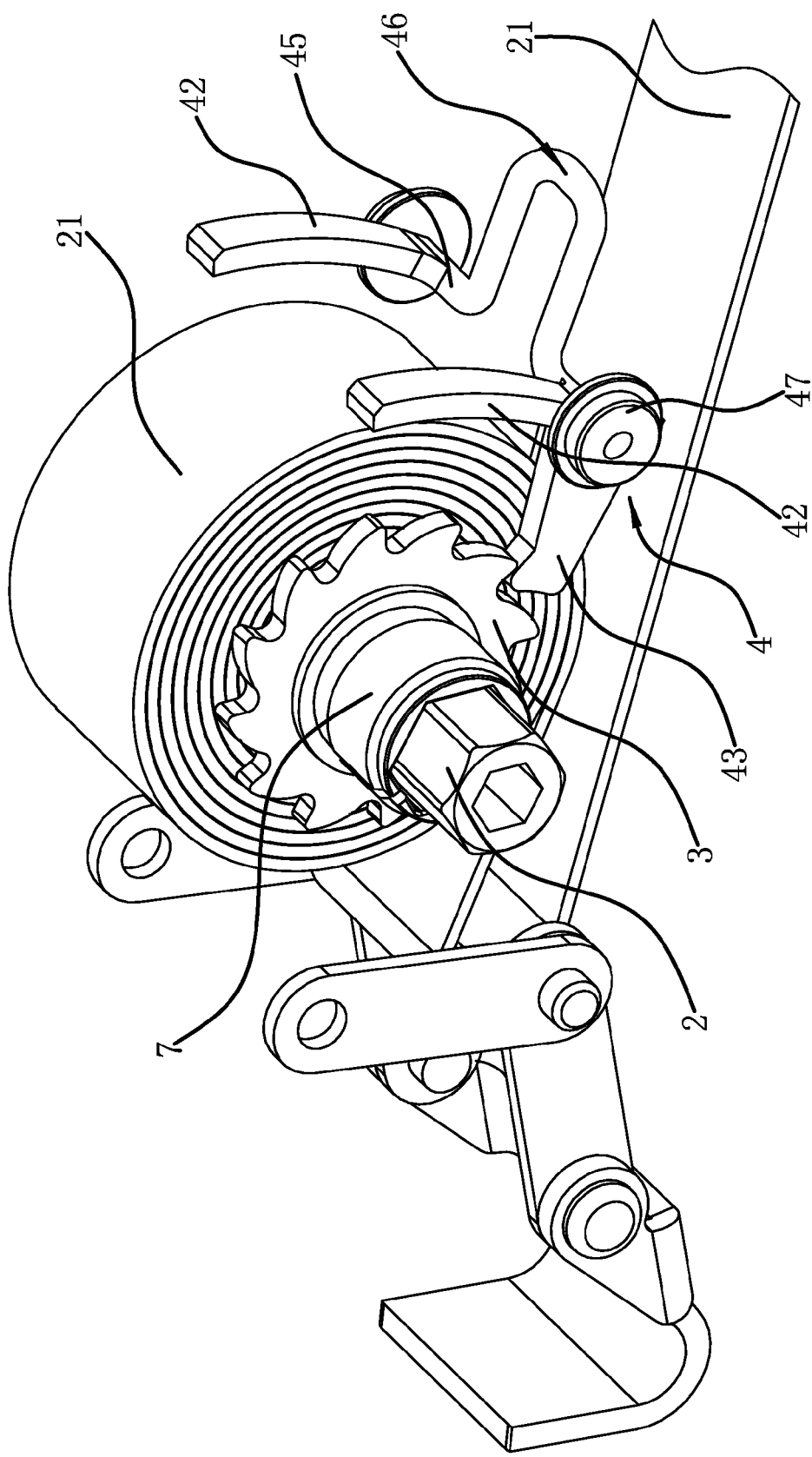
FIG. 8 is a partial perspective view of the wheel restraint device of the second embodiment, with the shell not installed yet.

Specifically, as shown in FIG. 6 and FIG. 7, the shell (1) comprises two half shells (11). Both of the two half shells (11) comprise a curved base plate (12) and a side plate (13) fixed to the base plate (12). The two half shells (11) are connected by bolts, and the two base plate (12) abut on each other to form a tire blocking plate (14). A curved wedge plate (6) is fixed onto the tire blocking plate (14), and the reel (2) is rotatably inserted into the two side plates (13). A ratchet (3) is fixed the reel (2) on each inner side of the two side plates (13), so the locking piece (4) includes an axial part (41). Both ends of the axial part (41) comprise a pawl (42), and the axial part (41) and the pawl (42) are integrally formed by metal. The locking rod (43) is located on one end of the axial part (41) and made of plastic. Of course, the pawl (42) may also be made of rubber, as long as it has an adequate strength to withstand the elastic force of the coil spring (5). The counterweight block (44) is located in the middle of the axial part (41), and a rotating sleeve (47) is sleeved over both ends of the axial part (41). A mounting hole (131) is arranged on the side plate (13) of the shell (1), and the rotating sleeve (47) is rotatably connected inside the mounting hole (131), making the axial part (41) parallel to the reel (2). Both ends of the reel (2) stretches out of the side plates (13), and connecting sleeves (7) is sleeved over and fixed to one of the stretched ends. A connecting opening (71) is arranged on the connecting sleeve (7), and a cover (8) is also fixed to one side plate (13). There is a connecting bulge (81) on the inner circumferential wall of the cover (8), and an L-shaped slot (82) is arranged on the connecting bulge (81). The coil spring (5) is arranged inside the cover (8), and both ends of the coil spring (5) are bended into hook shapes. One end of the coil spring (5) hooks in the connecting opening (71) of the connecting sleeve (7), and the other end hooks in the L-shaped slot (82) of the connecting bulge (81).

Second Embodiment

This automatic strap retracting mechanism for wheel restraint devices is basically the same as that of the first embodiment. The differences are:

The locking piece (4) also comprises a counterweight rod (45), and both ends of the counterweight rod (45) are rotatably connected to the inner wall of the shell (1). The locking rod (43) and the pawl (42) are both fixed to the end of the counterweight rod (45), and the central part of the counterweight rod (45) bends to form a protruding counterweight part (46). There is no need to arrange a counterweight block (44).

The description of the preferred embodiments thereof serves only as an illustration of the spirit of the invention. It will be understood by those skilled in the art that various changes or supplements in form and details may be made therein without departing from the spirit and scope of the invention as defined by the appended claims.

Although the terms of Shell (1), Half Shell (11), Base Plate (12) and etc. are often used herein, it does not exclude the possibility to use any other terms. Using such terms is only to describe or explain the nature of the present invention more conveniently. Any additional restrictions are contrary to the spirit of the present invention.

LIST OF REFERENCE NUMERALS

1 Shell
11 Half Shell
12 Base Plate
13 Side Plate
131 Mounting Hole
14 Tire Blocking Plate
2 Reel
21 Fastening Strap
3 Ratchet
31 Locating Surface
32 Guiding Surface
4 Locking Piece
41 Axial Part
42 Pawl
43 Locking Rod
431 Curved Pushing Surface
432 Abutting Surface
44 Counterweight Block
45 Counterweight Rod
46 Counterweight Part
47 Rotating Sleeve
5 Coil Spring
6 Curved Wedge Plate
7 Connecting Sleeve
71 Connecting Opening
8 Cover
81 Connecting Bulge
82 L-Shaped Slot

What is claimed is:

1. An automatic strap retracting mechanism for wheel restraint devices, comprising:
   a shell (1);
   a reel (2) rotatably connected inside the shell (2), the reel (2) capable of winding in and retracting a fastening strap (21);
   a ratchet (3) fixed onto the reel (2), the ratchet (3) having ratchet tooth surfaces;
   a locating surface (31) of the ratchet tooth surfaces, the locating surface (31) capable of preventing the fastening strap (21) from loosening;
   a guiding surface (32) of the ratchet tooth surfaces, the guiding surface (32) capable of preventing the fastening strap (21) from tightening;
   a locking piece (4) hinged to the shell (1);
   a pawl (42) of the locking piece (4), the pawl (42) capable of abutting and locking onto the locating surface (31);
   a locking rod (43) of the locking piece (4), the locking rod (43) fixed to the pawl (42), forming an included angle between the locking rod (43) and the pawl (42); and
   a coil spring (5) connected to the reel (2), the coil spring (5) capable of rotating the reel (2) in a strap tightening direction to wind in and retract the fastening strap (21);
   wherein when the pawl (42) detaches from the locating surface (31) and the fastening strap (21) is pulled out, the locking piece (4) is capable of swinging to allow the locking rod (43) to abut on the guiding surface (32).

2. The automatic strap retracting mechanism of claim 1, further comprising:
   a curved wedge plate (6) fixed to the shell (1), the curved wedge plate (6) capable of abutting on a vehicle wheel; and
   a counterweight block (44) of the locking piece (4), the counterweight block (44) capable of making the locking rod (43) abut on the guiding surface (32) of the ratchet (3) when the ratchet (3) rotates the strap tightening direction;
   wherein when the curved wedge plate (6) is placed facing downward, the locking rod (43) is below the pawl (42).

3. The automatic strap retracting mechanism of claim 2, further comprising:
   an axial part (41) of the locking piece (4), the axial part (41) parallel to the reel (2), two ends of the axial part (41) are rotatably connected to an inner wall of the shell (1); and
   the counterweight block (44) fixed to the axial part (41);
   wherein the locking rod (43) and the pawl (42) are located on at least one end of the axial part (41);
   wherein when the curved wedge plate (6) is placed facing downward, the locking rod (43) and the counterweight block (44) are located respectively on two sides of a vertical plane containing the axial part (41); and
   wherein under an action of the counterweight block (44), the locking rod (43) tends to swing upward and abuts on the ratchet (3).

4. The automatic strap retracting mechanism of claim 1, further comprising:

a curved wedge plate (6) fixed to the shell (1), the curved wedge plate (6) capable of abutting on a vehicle wheel; and a counterweight rod (45) of the locking piece (4), two ends of the counterweight rod (45) are rotatably connected to an inner wall of the shell (1);

wherein when the curved wedge plate (6) is placed facing downward, the locking rod (43) is below the pawl (42);

wherein the locking rod (43) and the pawl (42) are both fixed to the two ends of the counterweight rod (45);

wherein a central part of the counterweight rod (45) bends to form a protruding counterweight part (46); and wherein when the curved wedge plate (6) is placed facing downward, the locking rod (43) and the counterweight part (46) are respectively located on two sides of a vertical plane containing an axis line linking the two ends of the counterweight rod (45).

5. The automatic strap retracting mechanism of claim 3, further comprising:

a curved pushing surface (431) on the locking rod (43), the curved pushing surface (431) located on a side of the locking rod (43); and an abutting surface (432) located on an end of the locking rod (43);

wherein when the curved wedge plate (6) is placed facing downward and the ratchet (3) rotates in a strap loosening direction, the locating surface (31) is capable of pushing the curved pushing surface (431) downward; and wherein when the ratchet (3) rotates in the strap tightening direction, the guiding surface (32) is capable of abutting on the abutting surface (432) of the locking rod (43).

6. The automatic strap retracting mechanism of claim 3 wherein the locking rod (43) is made of plastic or rubber, and the locking rod (43) is sleeved over and fixed to one end of the axial part (41); and wherein the pawl (42) and the axial part (41) are of an integral structure.

7. The automatic strap retracting mechanism of claim 3, further comprising:

mounting holes (131) arranged on side walls of the shell (1);

wherein the two ends of the axial part (41) are inserted in rotating sleeves (47); and wherein the rotating sleeves (47) are rotatably connected inside the mounting holes (131).

8. The automatic strap retracting mechanism of claim 1 wherein the shell (1) comprises two half shells (11), both half shells (11) comprise curved base plates (12), and side plates (13) are fixed to the base plates (12);

wherein the two half shells (11) are fixed and connected to each other by bolts, and the two base plates (12) abut on each other to form a tire blocking plate (14); and wherein a curved wedge plate (6) is fixed onto the tire blocking plate (14), and the reel (2) is rotatably connected to the side plates (13).

9. The automatic strap retracting mechanism of claim 8, further comprising:

a cover (8) fixed to one of the side plates (13), the coil spring (5) arranged inside the cover (8);

wherein two stretched ends of the reel (2) stretch out of the side plates (13), and a connecting sleeve (7) is sleeved over and fixed to one of the stretched ends; and wherein a first end of the coil spring (5) is fixed to the connecting sleeve (7), and a second end is fixed to an inner circumferential wall of the cover (8).

10. The automatic strap retracting mechanism of claim 9, further comprising:

a connecting opening (71) arranged on the connecting sleeve (7);

a connecting bulge (81) on the inner circumferential wall of the cover (8); and an L-shaped slot (82) arranged on the connecting bulge (81);

wherein the two ends of the coil spring (5) are bended into hook shapes, the first end of the coil spring (5) hooks in the connecting opening (71) of the connecting sleeve (7), and the second end of the coil spring (5) hooks in the L-shaped slot (82) of the connecting bulge (81).

11. The automatic strap retracting mechanism of claim 4, further comprising:

a curved pushing surface (431) on the locking rod (43), the curved pushing surface (431) located on a side of the locking rod (43); and an abutting surface (432) located on an end of the locking rod (43);

wherein when the curved wedge plate (6) is placed facing downward and the ratchet (3) rotates in a strap loosening direction, the locating surface (31) is capable of pushing the curved pushing surface (431) downward; and wherein when the ratchet (3) rotates in the strap tightening direction, the guiding surface (32) is capable of abutting on the abutting surface (432) of the locking rod (43).

* * * * *